US010252568B2

(12) United States Patent
Meggiolan

(10) Patent No.: US 10,252,568 B2
(45) Date of Patent: Apr. 9, 2019

(54) BICYCLE WHEEL AND RELATIVE MANUFACTURING PROCESS

(71) Applicant: CAMPAGNOLO S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 22 days.

(21) Appl. No.: 15/461,885

(22) Filed: Mar. 17, 2017

(65) Prior Publication Data

US 2017/0267021 A1    Sep. 21, 2017

(30) Foreign Application Priority Data

Mar. 17, 2016  (IT) .............................. UA2016A1779

(51) Int. Cl.
*B60B 3/00* (2006.01)
*B60B 1/00* (2006.01)
(Continued)

(52) U.S. Cl.
CPC ................ *B60B 3/005* (2013.01); *B60B 1/00* (2013.01); *B60B 1/003* (2013.01); *B60B 1/02* (2013.01);
(Continued)

(58) Field of Classification Search
CPC .. B21K 1/34; B60B 1/00; B60B 1/003; B60B 1/02; B60B 1/043; B60B 1/044; B60B 1/045; B60B 1/046; B60B 1/047; B60B 1/048; B60B 1/14; B60B 21/023; B60B 21/025; B60B 21/062; B60B 21/08; B60B 3/08; B60B 3/085; B60B 3/10; B60B 3/14; B60B 5/02

USPC ........................ 29/894.33, 894.331, 894.333
See application file for complete search history.

(56) References Cited

U.S. PATENT DOCUMENTS 4,835,857 A     6/1989  Michelotti
4,919,490 A *  4/1990  Hopkins ................. B60B 1/003
                                                                301/104
(Continued)

FOREIGN PATENT DOCUMENTS

DE          8912606 U1    2/1990
EP          1404534 B1    4/2004
(Continued)

OTHER PUBLICATIONS

Italian Search Report and Written Opinion in Italian Application No. UA2016A001779, dated Nov. 14, 2016, with English translation.

*Primary Examiner* — Kip T Kotter
(74) *Attorney, Agent, or Firm* — Volpe and Koenig, P.C.

(57) ABSTRACT

A bicycle disc or spider wheel including: a hub; a rim having a radially outer tire-coupling region, a first sidewall, a second sidewall; an axis of rotation; and a median plane. A pair of pretensioned disc or spider wheel-type structural elements are integral with the hub and with the rim. The first sidewall extends on a first side of the wheel, with respect to the median plane, on which a component of a motion transmission system or, when there is none, a disc of a disc brake is provided at the hub, and the second sidewall extends on the opposite side, with respect to the median plane. The first sidewall of the rim has a minimum distance from the median plane that is smaller than that of the second sidewall of the rim.

22 Claims, 8 Drawing Sheets

(51) Int. Cl.
  *B60B 21/02* (2006.01)
  *B60B 5/02* (2006.01)
  *B60B 3/14* (2006.01)
  *B60B 1/14* (2006.01)
  *B60B 3/08* (2006.01)
  *B60B 21/06* (2006.01)
  *B60B 1/02* (2006.01)
  *B60B 3/10* (2006.01)
  *B60B 21/08* (2006.01)
  *B60B 27/00* (2006.01)

(52) U.S. Cl.
  CPC .................. *B60B 1/14* (2013.01); *B60B 3/08* (2013.01); *B60B 3/085* (2013.01); *B60B 3/10* (2013.01); *B60B 3/14* (2013.01); *B60B 5/02* (2013.01); *B60B 21/023* (2013.01); *B60B 21/025* (2013.01); *B60B 21/062* (2013.01); *B60B 21/08* (2013.01); *B60B 27/0052* (2013.01); *B60B 2320/10* (2013.01); *B60B 2900/111* (2013.01); *B60B 2900/112* (2013.01); *B60B 2900/311* (2013.01)

(56) References Cited

U.S. PATENT DOCUMENTS

| | | | |
|---|---|---|---|
| 5,104,199 A * | 4/1992 | Schlanger | B60B 1/003 301/64.704 |
| 5,452,945 A * | 9/1995 | Schlanger | B60B 1/003 301/104 |
| 5,540,485 A | 7/1996 | Enders | |
| 5,707,114 A * | 1/1998 | Schlanger | B60B 1/003 301/104 |
| 5,806,935 A * | 9/1998 | Shermeister | B60B 1/041 301/104 |
| 6,588,474 B2 * | 7/2003 | Passarotto | B60B 21/025 152/427 |
| 7,377,595 B1 | 5/2008 | Okajima et al. | |
| 9,108,461 B2 * | 8/2015 | Kismarton | B60B 3/082 |
| 9,724,959 B2 * | 8/2017 | Meggiolan | B60B 1/041 |
| 2007/0163850 A1 * | 7/2007 | Addink | B60B 3/002 188/18 A |
| 2010/0301663 A1 * | 12/2010 | Kismarton | B60B 5/02 301/64.704 |
| 2013/0342003 A1 * | 12/2013 | Meggiolan | B60B 1/041 301/58 |
| 2014/0292061 A1 * | 10/2014 | Lew | B60B 21/023 301/55 |

FOREIGN PATENT DOCUMENTS

| | | |
|---|---|---|
| EP | 2674304 A1 | 12/2013 |
| FR | 2673888 A1 | 9/1992 |
| JP | 05077602 A * | 3/1993 |

* cited by examiner

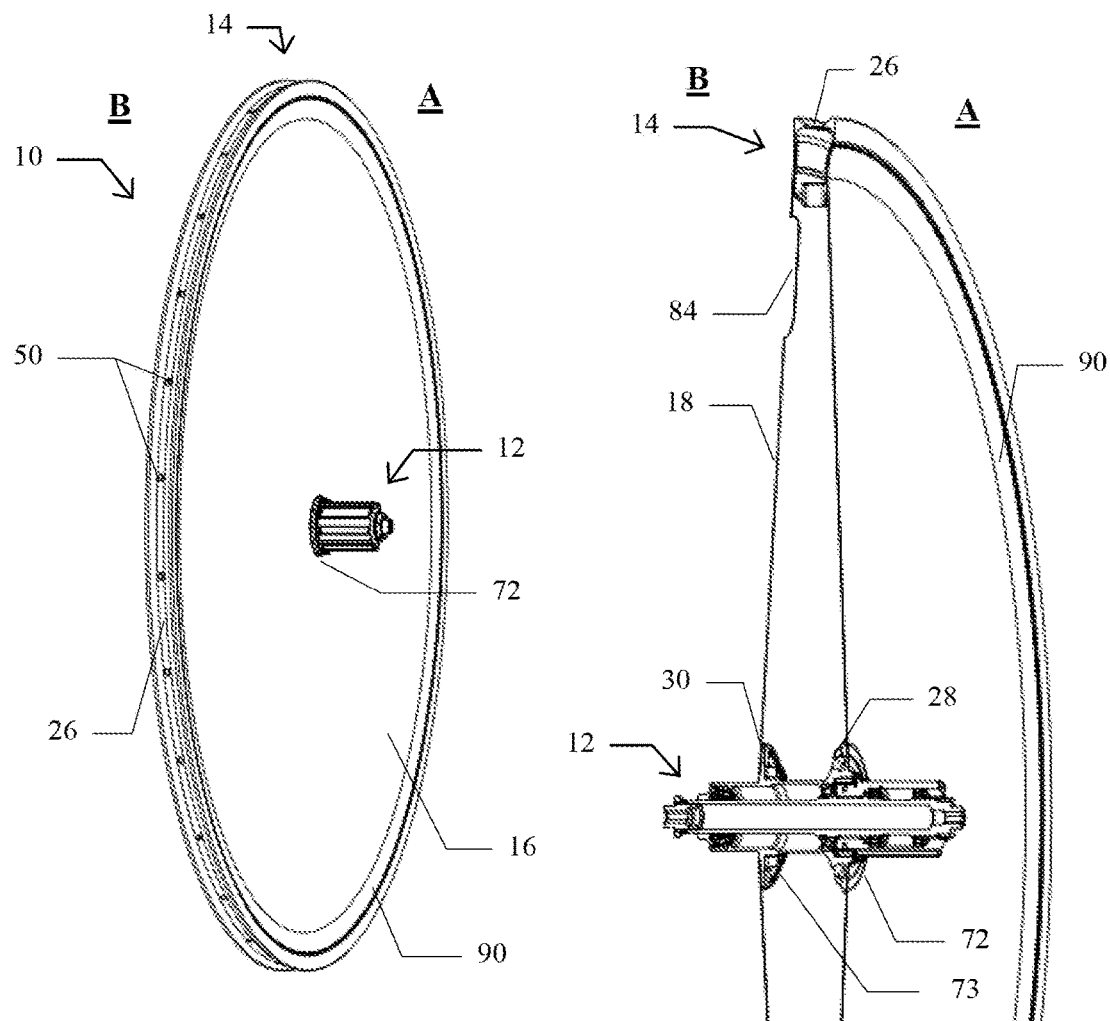
*Fig. 1*
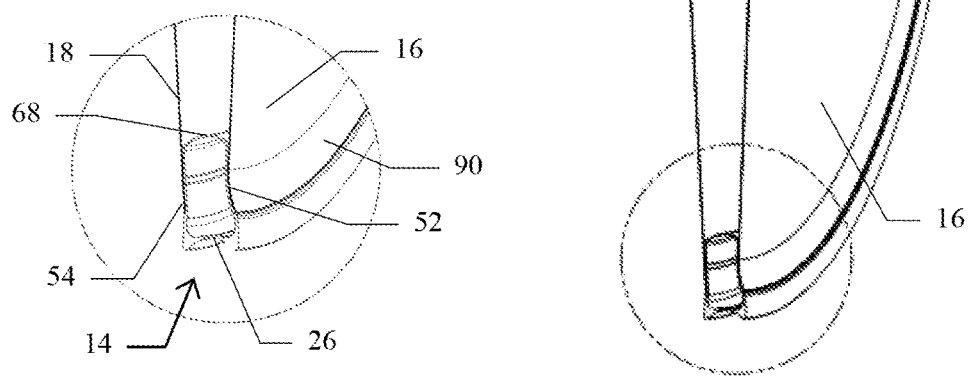
*Fig. 3*        *Fig. 2*

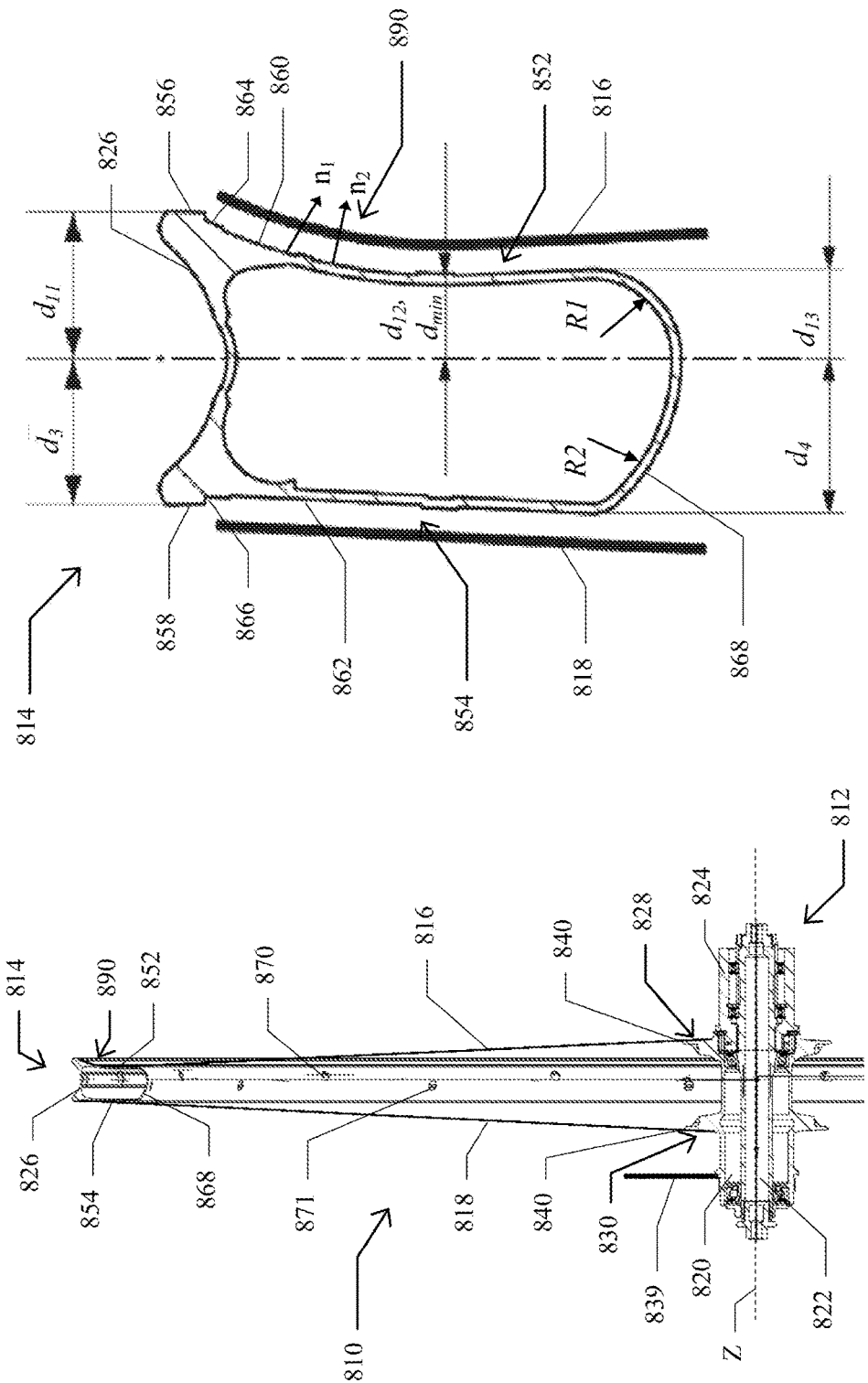

BICYCLE WHEEL AND RELATIVE MANUFACTURING PROCESS

CROSS REFERENCE TO RELATED APPLICATION

This application claims the benefit of Italian Application No. UA2016A001779, filed on Mar. 17, 2016, which is incorporated herein by reference as if fully set forth.

FIELD OF INVENTION

The present invention concerns a bicycle wheel, as well as a manufacturing process thereof. In particular the invention concerns a bicycle disc wheel, also known as lenticular wheel, of the type having a pair of disc-shape elements that replace the spokes, and a spider wheel, wherein instead of the spokes, a small number, like 3-5, of rigid elements connects the rim to the hub, the rigid elements being made as a single piece with, or irremovably fixed to, the hub and the rim. In spoked wheels, as opposite thereto, the spokes are removably fixed and are adjustable in tension.

BACKGROUND

Bicycle wheels with disc or spider legs made of composite material by injection or compression moulding are known. In the case of a disc or spider wheel, when the wheel is provided with a component of a motion transmission system and/or with a disc of a disc brake, then the disc-shaped elements or the spider leg assemblies on the two sides of the wheel are arranged according to different camber angles, consequently having different stiffness and therefore different resistance to stress.

The Applicant observed that the rim configured according to the prior art does not show adequate strength. The technical problem at the basis of the present invention is to improve the resistance to stress of such a disc or spider wheel, in particular in a wheel having a component of a transmission—such as a cogset—and/or a disc of a brake.

SUMMARY

The subject bicycle disc or spider wheel has a hub, a rim with a radially outer tire-coupling region, a first sidewall, and a second sidewall. A pair of disc or spider wheel-type pretensioned structural elements are integral with the hub and with the rim in a wheel which has an axis of rotation and a median plane. A first sidewall extends on a first side of the wheel, with respect to the median plane, on which a component of a motion transmission system or, when there is none, a disc of a disc brake is provided at the hub, and the second sidewall extends on the opposite side, with respect to the median plane. The first sidewall has a minimum distance from the median plane that is less than that of the second sidewall.

BRIEF DESCRIPTION OF THE DRAWINGS

Further features and advantages of the invention will become clearer from the description of some preferred embodiments thereof, made with reference to the attached drawings, wherein:

FIG. 1 schematically illustrates a disc wheel according to an embodiment of the invention, FIG. 2 illustrates a perspective view of one half of the wheel of FIG. 1, FIG. 3 illustrates a detail of the wheel of FIG. 1, FIGS. 10-13 are views analogous to FIG. 9, but relative to other embodiments of the invention, FIGS. 14-17 schematically show a step of the manufacturing process of three further embodiments of the invention, wherein FIG. 18 illustrates a partial cross-sectional view of another embodiment of a wheel according to the invention, and FIG. 19 illustrates a cross-section of a rim of the wheel of FIG. 18, two structural elements thereof being also partially shown.

DETAILED DESCRIPTION OF THE PREFERRED EMBODIMENTS

Figure 4:
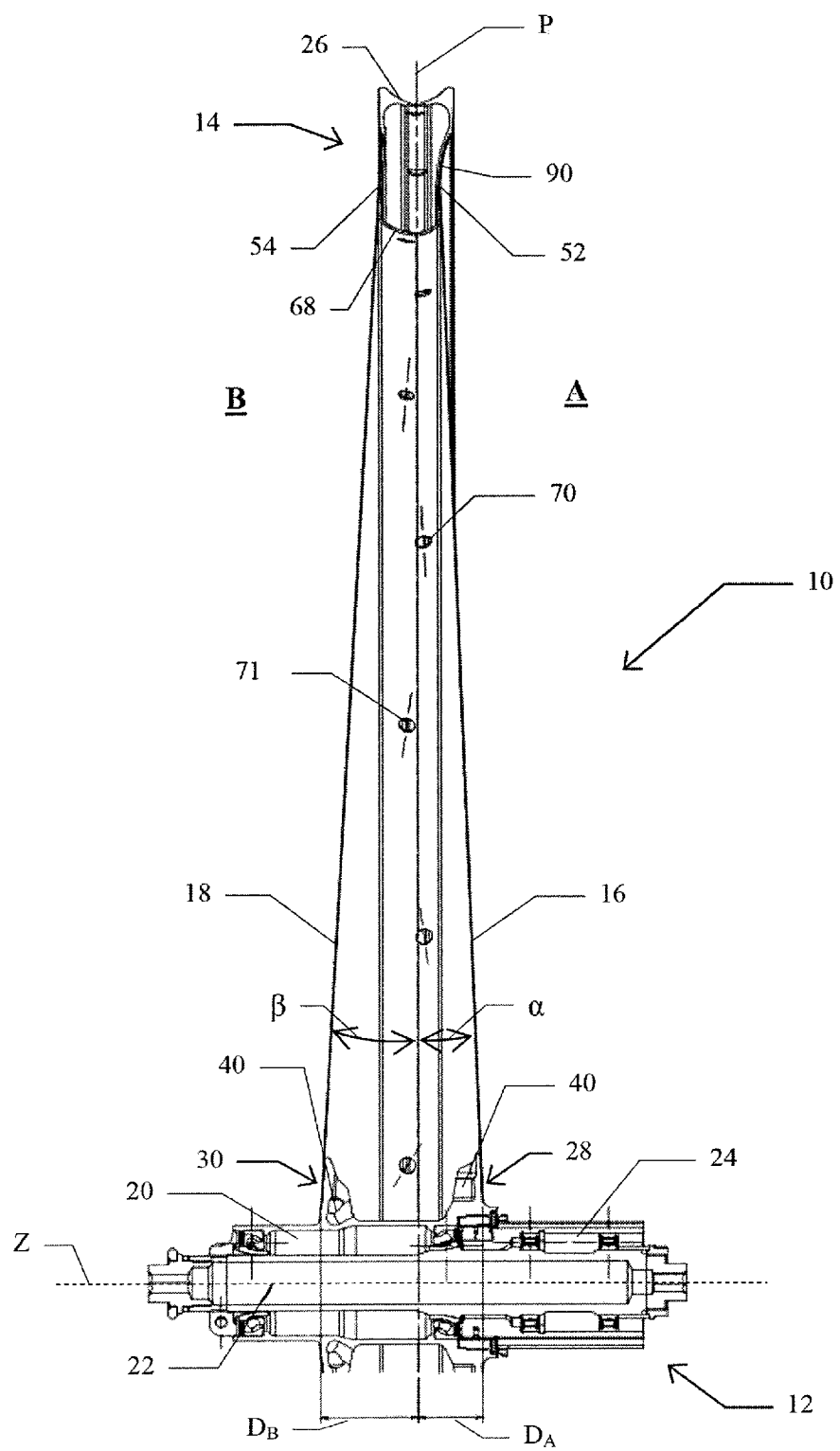
FIG. 4 illustrates a partial cross-sectional view of the wheel of FIG. 1, FIGS. 5-6 schematically illustrate various details of a step of the manufacturing process of the wheel of FIG. 1, FIGS. 7-8 schematically illustrate the starting material of structural elements of the wheel of FIG. 1.

In one aspect, the invention concerns a bicycle disc or spider wheel, comprising:
a hub,
a rim having a radially external tire-coupling region, a first sidewall, and a second sidewall,
a pair of disc or spider wheel-type structural elements integral with the hub and the rim, wherein said structural elements are pretensioned,
the wheel having an axis of rotation and a median plane extending orthogonally to the axis of rotation at an axially intermediate point of the radially external region, and at an axially intermediate point of the hub,
wherein the first sidewall extends on a first side of the wheel, with respect to the median plane, on which a component of a motion transmission system or, when there is none, a disc of a disc brake is provided at the hub, and the second sidewall extends on the opposite side, with respect to the median plane.

The first sidewall of the rim has a minimum distance from the median plane smaller than the second sidewall of the rim.

The distance is meant to be measured on the outer face of the first or second sidewall, respectively.

The radially outer region can be configured, in a per se known manner, as a tire coupling channel for tubeless, clincher or tubular tire wheels.

Through this provision, the structural element of the first side, on which there is the hindrance of the transmission and/or of the disc of the brake, can be arranged according to a suitable camber angle, close to that of the structural element of the second side, and thus granting adequate strength to the wheel, even though the position of attachment to the hub on the first side, in particular a flange of the hub, is closer to the median plane with respect to the position of attachment to the hub or flange of the hub on the second side.

The existence of the pre-tensioning of the structural elements can be verified in a wheel for example by making a cut in the structural element and checking whether the edges of the cut move apart and/or whether the geometry of the rim moves away from circularity and/or whether rim and hub become offset from one another.

In embodiments, the rim further comprises a radially inner wall extending between the sidewalls.

In an embodiment, the radially inner wall of the rim on the side of the first sidewall has a radius of curvature smaller than the radius of curvature on the side of the second sidewall.

In an embodiment, the radially inner wall of the rim on the side of the first sidewall has a same radius of curvature as on the side of the second sidewall.

The radii of curvature of the radially inner wall are selected in an appropriate manner. With large values of the radius of curvature, the radially inner region of the rim has a fairly rounded section and the fibers of the composite material work better; vice-versa with small values of the radius of curvature, the radially inner wall of the rim has a flatter shape in cross-section and therefore a better lateral strength.

Preferably, the first sidewall and the second sidewall each have a radially inner region for coupling with a structural element of the pair, and the distance from the median plane of the coupling region of the first sidewall is shorter than the distance from the median plane of the coupling region of the second sidewall at all the radial distances from the axis of rotation, except for a maximum radial distance of the coupling regions.

Preferably, the distance from the median plane of the coupling region of the second sidewall increases, more preferably uniformly increases, as the radial distance from the axis of rotation decreases.

Preferably, the distance from the median plane of the coupling region of the first sidewall initially decreases and then increases, more preferably uniformly increases, as the radial distance from the axis of rotation decreases.

Preferably, the distance from the median plane of the coupling region of the first sidewall at the minimum radial distance from the axis of rotation is shorter than the distance from the median plane of the coupling region of the first sidewall at the maximum radial distance from the axis of rotation of the coupling region of the first sidewall.

Preferably, the distance from the median plane of the coupling region of the first sidewall is maximum at the maximum radial distance from the axis of rotation of the coupling region of the first sidewall.

Preferably, a region for coupling with the structural element of the first sidewall deviates from a frusto-conical shape.

More preferably, the region for coupling with the structural element of the first sidewall deviates from a frusto-conical shape so that the normals to the coupling region in at least two points converge on the side of the outer face of the coupling region, not facing the second sidewall.

Overall, therefore, the region for coupling with the structural element of the first sidewall has a recess or is recessed as a whole.

Preferably, the first sidewall and the second sidewall each have a radially outer braking region.

More preferably, the first sidewall has said radially outer braking region, said radially inner region for coupling with the structural element, and a joining region between them.

Preferably, the joining region has a greater wall thickness than the region for coupling with the structural element.

In embodiments, the coupling region of the first sidewall has a curved radially outer region, with a concave outer face.

Preferably, the radius of curvature in the coupling region of the first sidewall is constant.

Preferably, the structural element of the pair extending between the hub and the rim on the first side of the wheel has, in a peripheral region thereof, a recess or a rise so as to have a shape matching that of the coupling region of the first sidewall.

This shape of the structural element increases the stiffness thereof, as those skilled in the art will understand.

Furthermore, the coupling between the rim and the structural element on the first side of the wheel advantageously occurs on a larger surface with respect to the coupling between the rim and the structural element on the second side of the wheel.

Preferably, in the case of spider wheel-type structural elements, the spider legs are in corresponding angular positions so as to be facing each other.

In the disc or spider wheel according to the invention, preferably the hub and/or the rim comprise a plurality of spoke attachment seats, but there are no spokes extending between the hub and the rim.

In particular, the radially outer region of the rim has a plurality of attachment seats for tensioning elements, and the radially inner wall of the rim, where provided for, has a plurality of passage openings for said tensioning elements, said tensioning elements being absent in the finished wheel.

Preferably, the attachment seats for tensioning elements are aligned at the median plane, while alternate passage openings are aligned at two planes parallel to the median plane, the passage openings associated with tensioning elements extending between the rim and a flange of the hub on the first side being aligned at a first plane, and the passage openings associated with tensioning elements extending between the rim and a flange of the hub on the second side being aligned at a second plane, wherein the first plane is closer to the median plane than the second plane.

Preferably, the hub comprises said pair of flanges having facing faces, and the plurality of spoke attachment seats in the hub are hollowed out in the facing faces of the flanges.

In this way, the non-facing faces of the flanges, namely those axially outside of the wheel, advantageously have no seats and therefore have a full surface suitable for gluing the structural elements. Moreover, making the seats on the facing faces of the flanges allows the spokes to be unseated for their removal, despite the presence of the two structural elements.

Preferably, the hub and/or the rim comprise projecting lugs at the areas of contact with the structural element. Such projecting lugs ensure the formation of a film of gluing substance of suitable thickness between the hub and/or the rim and the structural elements.

Preferably, the structural elements are made of composite material, namely of polymeric material reinforced by structural fiber. The structural fiber is preferably carbon fiber, but glass fiber, boron fiber, aramid fiber, ceramic fiber and their combinations can also be used. The polymeric material is preferably of the thermosetting type, preferably a thermosetting epoxy resin, but a thermoplastic polymeric material can be used.

Such an embodiment, compared to one made of metal, offers the advantage of the wheel being lighter the strength being equal.

Preferably, the structural elements made of composite material comprise fiber extending along a plurality of radial directions and/or fiber extending along a plurality of chord directions, which gives high strength to the wheel.

Preferably, the structural element on the first side of the wheel has a greater thickness than the structural element on the second side of the wheel.

In this way it is possible to compensate for the difference in stiffness due to the difference in camber angle.

More preferably, the structural element on the first side of the wheel has a greater number of plies of composite material than the structural element on the second side of the wheel.

Preferably, the structural element on the second side of the wheel has two plies of bidirectional composite material and, arranged between them, a plurality of strips of ply (also named "patches" hereinafter) of unidirectional composite material extending in radial directions, more preferably equally angularly spaced.

Preferably, the structural element on the first side of the wheel has two plies of bidirectional composite material and, arranged between them, a plurality of strips of ply of unidirectional composite material extending in radial directions, more preferably equally angularly spaced, having a number of strips of ply greater than and more preferably double with respect to the number of strips of ply of the structural element on the second side of the wheel.

Preferably, said at least one structural element is glued to the rim and to the hub, more preferably through a bicomponent epoxy resin.

In one aspect, the invention concerns a manufacturing process of a bicycle disc or spider wheel, comprising the sequential steps of:

a) providing a hub and a rim, b) applying a compression onto the rim towards the hub elastically deforming it, c) rendering a pair of disc or spider wheel-type structural elements integral with the hub and the rim, and d) removing the compression onto the rim applied in step b).

wherein step b) comprises extending a plurality of tensioning elements between the hub and the rim and tensioning them, and step d) comprises removing the tensioning elements.

In step b), the tensioning elements extend between the hub and a radially outer wall of the rim.

Therefore, the tensioning elements that are used in the manufacturing process of the wheel are tensioned between the hub and the radially outer wall of the rim or tire coupling channel, instead of between the hub and the radially inner wall of the rim like in the cited document EP 2 674 304 A1. This provision is advantageous since it avoids a stretching deformation of the cross-section of the rim during the compression of the rim towards the hub, which deformation could deteriorate the circularity of the rim causing the so called "daisy effect" on the radially inner wall of the rim, and could involve imperfections on the finished wheel due to wrinkles on the structural elements.

Moreover, this provision avoids the need to reinforce the thickness of the radially inner wall, with consequent advantages in terms of cost and weight, while the radially outer wall of the rim or upper bridge is already strong enough since it is sized to withstand the pressures of the tire.

Furthermore, this provision advantageously allows the mounting of the tensioning elements, and their dismounting once the disc or spider wheel-type structural elements have been rendered integral with the hub and with the rim, to be made easier.

Furthermore, this provision allows—the fixing seats of the tensioning elements in one of the walls of the rim having the same size—smaller openings to be made in the other wall of the rim, since they must allow the passage of the tensioning elements instead of a tool suitable for tightening them, with consequent less weakening of the rim.

This provision allows the tension that will be accomplished by the structural elements in the finished wheel to be closely approximated during the manufacturing of the wheel, since the tensioning elements geometrically extend along directions that better approximate the position that the structural elements will take up in the finished wheel.

Furthermore, the tensioning elements, during manufacturing, apply a practically optimal tension, approaching the ideal case of tension applied between the hub and the periphery of a tire. A practically optimal tension is thus granted to the structural elements in the finished wheel.

This provision finally allows the need to provide for a specific apparatus for the compression of the rim towards the hub to be avoided, and allows the tension of the spokes to be individually adjusted, for example also taking dishomogeneities into account, such as the tire inflation valve and/or the joint of the rim in the case of a metal rim.

More preferably, the tensioning elements comprise bicycle spokes.

Preferably, the bicycle spokes are oversized with respect to a bicycle spoked wheel comprising an identical hub and an identical rim. In this way, the tensioning spokes are stronger and undergo less percentage elongation during tensioning.

Preferably, step b) comprises controlling the centering and the circularity of the wheel during the application of the compression.

Preferably, step c) comprises inserting the pair of disc or spider wheel-type structural elements onto the hub from axially opposite ends.

Preferably, step c) comprises the step of gluing the disc or spider wheel-type structural elements to the hub and to the rim.

Preferably, step c) comprises the step of gluing through a bicomponent epoxy resin.

Preferably, step c) comprises press gluing the structural elements, more preferably while they are removably associated with a respective support applicator.

Preferably, step b) comprises the step of simulating the stress on the rim and/or on the hub during the subsequent gluing step.

Preferably, step d) comprises unseating the tensioning elements from a respective seat in a flange of the hub towards an opposite flange.

Alternatively, step d) comprises removing the tensioning elements by unthreading them through a respective seat in a flange of the hub.

With particular reference to FIGS. 1-4, a disc or lenticular wheel 10 according to an embodiment of the present invention comprises a hub 12, a rim 14 and a pair of disc structural elements 16; 18 each extending between the hub 12 and the rim 14 and pretensioned.

The discs 16; 18 are configured as slightly frusto-conical, apart from what is described hereinafter.

The hub 12 comprises a hub body 20 rotatably mounted on an axis 22 of the hub, in a per se well known manner. The axis of rotation Z of the wheel 10 extends longitudinally through the hub axis 22.

A median plane P of the wheel 10 extends orthogonally to the axis of rotation Z, at the axially intermediate point of the hub axis 22 and at the axially intermediate point of a tire coupling channel 26 of the rim 14.

In the case shown, the disc wheel 10 is a rear wheel. In such a case, the hub 12 further comprises a freewheel body 24 also rotatably mounted on the hub axis 22, in a per se well known manner, on a first side (indicated with A in the Figures) with respect to the median plane P.

The freewheel body 24 is a component of a motion transmission system, being provided for mounting a cogset (not shown).

In a per se well known manner, the freewheel body 24 is configured to be set into rotation by the rotation in one direction of a pair of pedal cranks and to transmit the rotation to the hub body 20, as well as to let the hub body 20 free to rotate about the hub axis 22 when the pedal cranks are not actuated and/or when they are actuated in an opposite direction.

Due to the presence of the freewheel body 24, the hub body 20 is not axially centered with respect to the hub axis 22. In other words, the axially intermediate point of the hub body 20 does not lie on the median plane P, rather it is displaced on a second side (indicated with B in the Figures) of the wheel 10, opposite to the first side A with respect to the median plane P.

The hub body 20 comprises a pair of flanges 28; 30. The structural elements 16; 18 extend between the rim 14 and a respective flange 28; 30. The flanges 28; 30 have a slightly frusto-conical shape.

Due to the presence of the freewheel body 24, the flanges 28; 30 are not equally spaced from the median plane P. In particular, the flange 28 on the first side A is a distance DA from the median plane P shorter than the distance DB between the flange 30 on the second side B and the median plane P.

The structural element 16 extending on the first side A between the rim 14 and the first flange 28 of the hub 12, as well as the first flange 28 itself, therefore have a smaller camber angle ALPHA than the camber angle BETA of the second flange 30 and of the structural element 18 extending on the second side B between the rim 14 and the second flange 30 of the hub 12, wherein under camber angle, the angle formed, in a radial section, between the frusto-conical portion of the structural element 16; 18 and the median plane P is meant, namely the complementary angle of the half-apex angle of the frustum of cone.

There are also different camber angles on the two sides with respect to the median plane P in the case of a front wheel coupled with a disc brake due to the presence, on one side, of a brake disc. In the case of a rear wheel coupled with a disc brake, because the space occupied by the freewheel body 24 is usually greater than the space occupied by the brake disc, the smaller camber angle is obtained in any case on the transmission side, whether the brake disc is on the same side as the freewheel body, or it is on the opposite side (see FIG. 18 later described). In the case of a front wheel, on the other hand, since the freewheel body is absent, the smaller camber angle is located on the side of the brake disc.

Different camber angles ALPHA, BETA imply a different stiffness of the structural elements 16; 18. In particular, as the camber angle increases, the tangential stiffness increases, while as the camber angle decreases, the radial stiffness increases.

However, due to the presence of the freewheel body 24—and of the brake disc if mounted on the same side as the freewheel body 24, or in the case of a front wheel and a brake disc on such a side A—, it is not possible to increase the distance DA between the flange 28 of the hub 12 and the median plane P beyond certain limits.

In order to maximize the camber angle ALPHA of the structural element 16 of the first side A, according to the invention a particular shape of the rim 14 is therefore provided, better described hereinafter.

Such a particular shape of the rim 14 preferably corresponds to a particular shape of the disc structural element 16 on the first side A, better described hereinafter.

A manufacturing process of a disc or lenticular wheel 10 according to the invention will now be described briefly. For further details, reference can be made to the aforementioned EP 2 674 304 A1.

Initially a hub 12, a rim 14, a plurality of spokes 32 and a corresponding plurality of nipples 34 and possibly centring washers 36 (FIG. 5-6) are provided. The spokes 32 are extended between the hub 12 and the rim 14, and each is fixed through a nipple 34 and possibly a centring washer 36, in a similar manner to the case of manufacturing a spoked wheel, apart from what is specified hereinafter. Spoke 32, nipple 34 and washer 36 form a tensioning element 38.

On the two flanges 28; 30 of the hub 12, seats 40 are preferably made for the spokes 32. The seats 40 are made on the facing faces of the flanges 28; 30, while in hubs of spoked wheels, the seats for the spokes are typically made on the outer faces of the flanges, opposite to the facing faces. Seats 40 and spokes 32 are configured in a per se known manner, so that the spokes 32 are held against unthreading or exiting from the seats 40, and can be tensioned by tightening the nipples 34.

Figure 6:
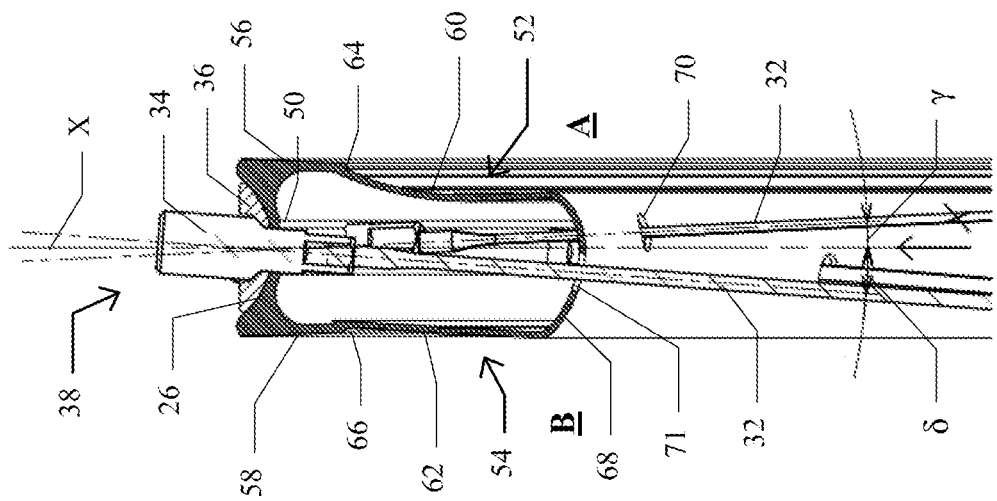
Figure 5:
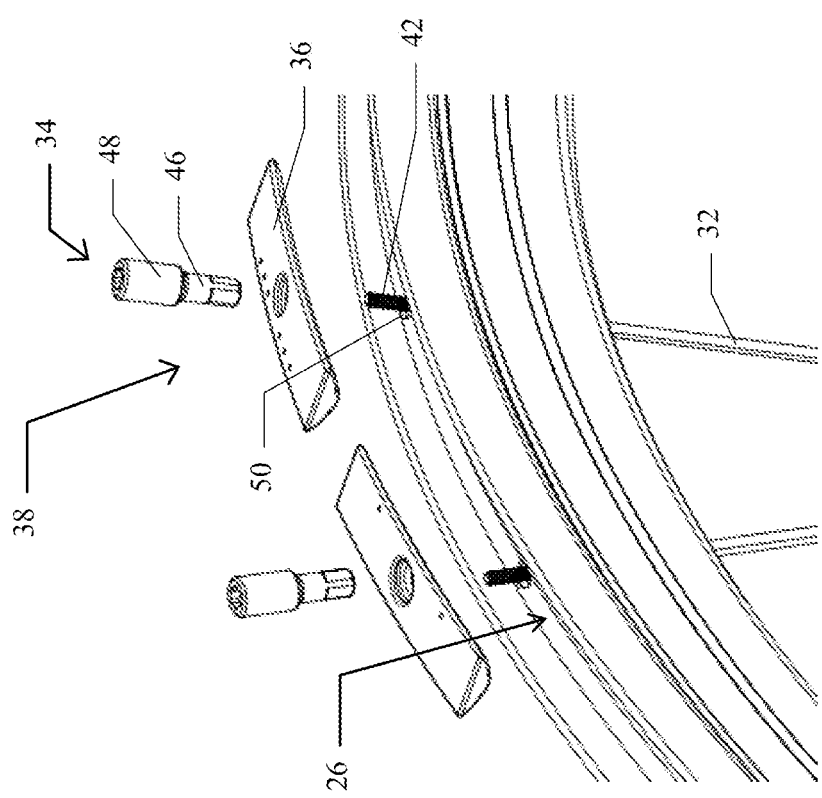

As more clearly visible in FIG. 5-6, at the end of conjunction with the rim 14, each spoke 32 has a threading 42 intended for coupling in an internally threaded hole of a stem 46 of the nipple 34. The nipple 34 has a head 48 that projects perpendicularly to the longitudinal direction of the stem 46 of the nipple 34, coinciding with the tensioning direction X of the spoke 32, so as to prevent it from unthreading from a seat 50 of the rim 14, in the form of an unthreaded circular hole.

As stated, between the nipple 34 and the seat 50 of the rim 14, a centering washer 36 can be provided, which allows the spontaneous orientation of the spoke 32 with the suitable camber angle GAMMA, DELTA.

Differently from a conventional spoked wheel and from the aforementioned EP 2 674 304 A1, the seats 50 for the nipples 34 are made on the tire coupling channel 26.

The rim 14 is indeed a hollow annular element made of metal, typically aluminum, or of composite material, which comprises, radially on the outside, the region 26 configured as a tire-coupling channel.

The rim 14 further comprises two sidewalls indicated with 52; 54.

In the case shown, the region 26 of the rim 14 is formed by a wall 26 configured for a tubular tire, and the sidewalls 52; 54 extend from the wall 26 radially inwards, but—in a per se well known manner—the sidewalls can extend from the wall 26 radially both inwards and outwards, and can be bent towards each other radially outside the wall 26, for coupling with an inner tube tire and casing or a tubeless tire.

The sidewalls 52; 54 each comprise a radially outer braking region 56; 58, and a radially inner region 60; 62 for coupling with a disc later described, the two regions forming a step 64; 66.

In the case shown, the two sidewalls 52; 54 are joined by a radially inner wall or lower bridge 68, in which openings 70; 71 for the passage of spokes 32 are made.

The shape of the two sidewalls 52; 54 will be described hereinafter.

The two sidewalls 52; 54 can have a variable thickness as shown, depending on the mechanical stresses expected in the various areas. In the case of a rim 14 made of composite material, the various areas can be formed by a different number of plies of composite material.

The openings 70; 71 on the radially inner wall 68 are preferably equally spaced as shown, and alternately used for a spoke 32 extending towards one of the flanges 28 of the hub 12 and for a spoke 32 extending towards the other flange 30.

However, this is not strictly necessary: seats that are not equally spaced (see for example FIGS. 14-17) and/or a different number of spokes on the first side A than the number of spokes on the second side B can be provided for.

Preferably, the attachment seats 50 for the spokes 32 are aligned at the median plane P, while the passage openings 70; 71 are aligned at two planes parallel to the median plane, the passage openings 70 associated with spokes 32 extending between the rim 14 and the flange 28 of the hub 12 on the first side A being aligned at a first plane, and the passage openings 71 associated with spokes 32 extending between the rim 14 and the flange 30 of the hub 12 on the second side B being aligned at a second plane, wherein the first plane is closer to the median plane P than the second plane.

In the case of a tubeless tire, the seats 50 on the radially outer wall 26 are plugged up in a subsequent processing step, for example by gluing or molding a strip (not shown) of composite material onto the bottom of the channel 26.

The rim 14 could have further stiffening walls in a per se well known manner.

The hub 12 is preferably provided for a radial-type spoking as shown—wherein the spokes extend between the hub 12 and the rim 14 along radial directions, neglecting the camber; however a tangential-type spoking could be provided.

Means for coupling the spoke 32 both to the rim 14 and to the hub 12 different from those shown and described above could be provided.

Going back to the manufacturing process, before mounting the spokes 32, the rim 14 is preferably prepared for the application of a gluing substance, for example, in the case of an aluminum rim, through a known FPL/PPA process, which comprises a chromic acid bath that opens the pores of the aluminum and the application of an anti-corrosion primer.

Once the spokes 32 are mounted extending between the hub 12 and the rim 14, they are tensioned.

Preferably, an over-tension is applied, of at least 5%, preferably of at least 20%, more than a conventional spoked wheel having the same hub 12 and the same rim 14.

The use of spokes 32 allows optimal tensioning, considering different localized masses like for example the junction of the ends of the calendered profile in the case of a metal rim and/or the vicinity of a seat for the tire inflation valve, as well as possible other non-uniformities of the rim that are intended and/or a consequence of the manufacturing process.

It is worthwhile emphasizing that making the seats 40 on the facing faces of the flanges 28; 30 of the hub 12 reduces the camber angles GAMMA, DELTA of the spokes 32 with respect to a conventional hub, which advantageously makes it possible to better impart the tension between hub 12 and rim 14, the stress of the spokes 32 being equal.

Moreover, the spokes 32 are preferably over-sized in thickness, with respect to a conventional spoked wheel having the same hub 12 and the same rim 14, so as to undergo less elongation with respect to conventional spokes, and therefore be able to better impart the tension between hub 12 and rim 14. Moreover, by limiting or avoiding the elongation of the spokes 32, it is possible to reuse the spokes 32, after their removal as described later on, for manufacturing a further wheel 10. Furthermore, having a larger cross-section, the threading 42 of the spoke 32 and the internal threading of the hole of the nipple 34 have larger contact surfaces and therefore greater strength to the tensioning of the spoke 32. It is also made easier to use a torque meter to evaluate the screwing torque.

During the tensioning of the spokes 32, the centering and the circularity of the wheel 10 is monitored and ensured, repeating the tensioning of individual spokes 32 if necessary.

Preferably, a thrust is also applied onto the rim 12 and/or onto the hub 14 in the direction of the axis Z of the hub 12, for example a thrust of 0.5 bar, to simulate the stress on the wheel during a subsequent gluing step of the structural elements 16; 18 later described, repeating the tensioning of the individual spokes 32 if necessary. The simulation thrust can be applied for example through a pneumatic or hydraulic system used during said gluing step or by arranging the assembly being manufactured on a plane and putting weights on the rim 12 and/or on the hub 14.

Thereafter, the two disc structural elements 16; 18 provided with a central hole 72; 73 are threaded on the hub 12 from its axially opposite ends, and leant on the flanges 28; 30 of the hub 12 and on the rim 14 at the radially inner coupling regions 60; 62 thereof, with the interposition of an adhesive substance (not shown).

As stated, the discs 16; 18 are configured as slightly frusto-conical, apart from an annular recess or rise described later on, according to respective camber angles ALPHA, BETA. The discs 16; 18 have such a diameter as to cover the coupling regions 60; 62 of the sidewalls 52; 54 of the rim 14 as exactly as possible up to the step 64; 66.

In greater detail, the outer face of the flanges 28; 30 of the hub 12 and/or the regions 60; 62 of the sidewalls 52; 54 of the rim 14 for coupling with the discs 16; 18 preferably have slightly projecting lugs (not shown) for some points of the discs 16; 18 to rest on so that most of the surface of the discs 16; 18 is a certain distance from the surface of the flanges 28; 30 and of the sidewalls 52; 54, such as to ensure a suitable thickness of adhesive substance. For example, the lugs can comprise a circumferential lug extending all around the axis Z of the hub 12 and the rim 14, and/or a plurality of small lugs. The lugs can for example have an elevation of 0.1-0.2 mm to ensure a film of gluing material of such an amount. The flanges 28; 30 of the hub 12 also preferably have channels (not shown) extending in a radial direction for the excess adhesive substance to come out from. Similar channels can be provided in the rim 14.

The discs 16; 18 can be metallic, but they are preferably made of composite material.

Figure 7:
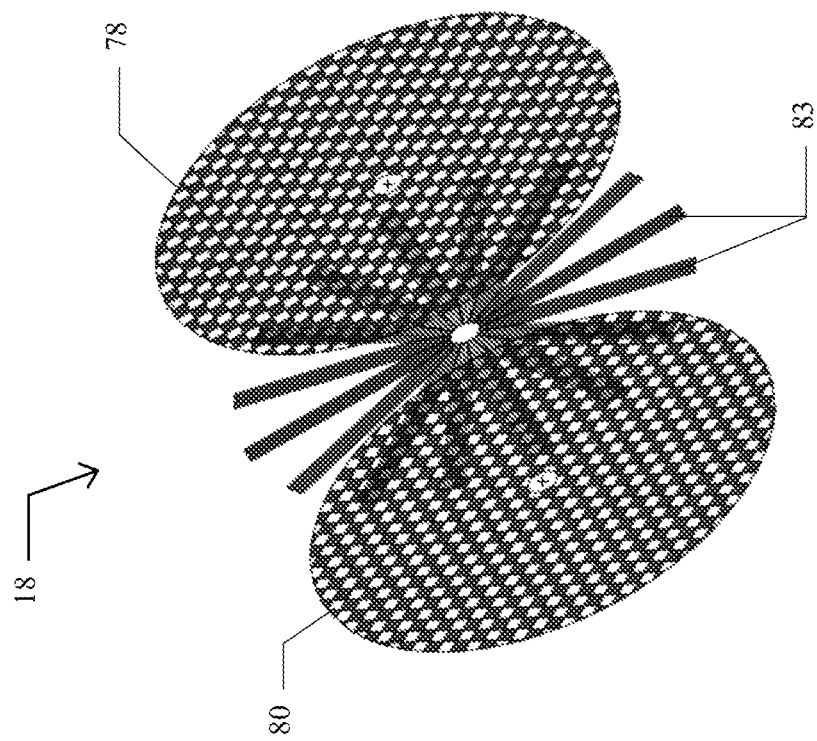
Figure 8:
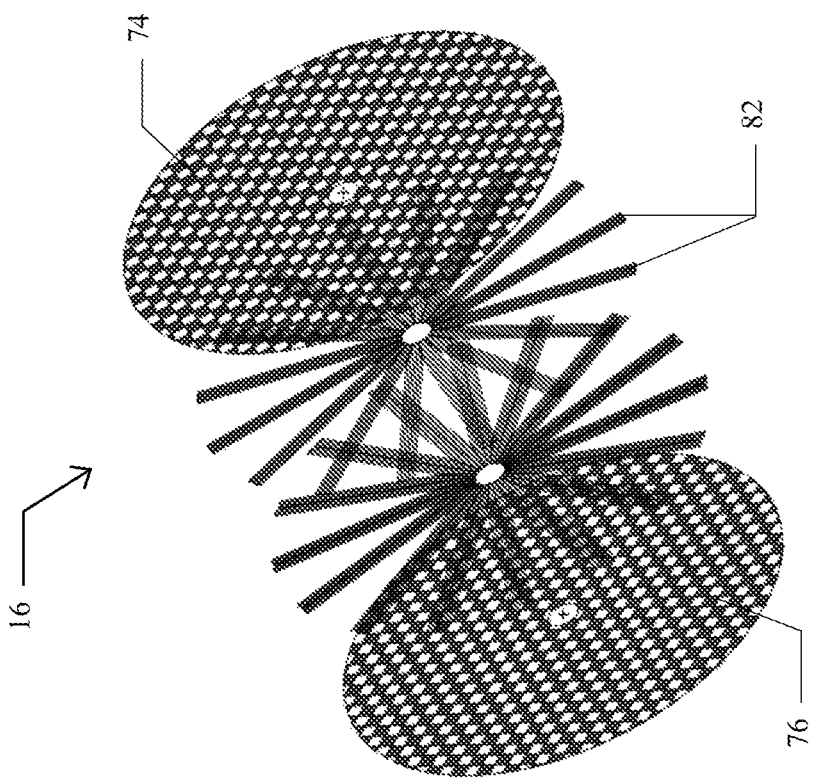

Preferably, as shown in an entirely schematic form in FIG. 7-8, the discs 16; 18 comprise each a plurality of plies of composite material. In each ply, the structural fiber is preferably woven fiber, comprising fibers extending according to a weft direction and fibers extending according to a warp direction, substantially perpendicular thereto. Preferably, each disc 16; 18 has two such plies 74 and 76, and 78, 80, respectively. Plies 74, 76; 78, 80 of each disc 16; 18 may have the warp/weft directions angularly offset by an angle, preferably equal to 45°. In this way, the structural fiber extends in the wheel 10 according to a plurality of radial/diametrical directions, as well as according to a plurality of chords, namely directions extending between a pair of points of the rim not diametrically opposite.

Preferably, moreover, each disc 16; 18 also has a plurality of strips or patches 82; 83 of composite material ply in which the structural fiber is unidirectional, extending according to a direction that becomes a radial direction in the wheel 10. As an example, N patches 83 are shown in FIG. 8 for the disc 18 of second side B, for which reason the fiber extends according to N directions radially spaced by 360°/N, and according to directions that are adjacent and parallel to such N directions.

For the disc 16 of the first side A, on the other hand, FIG. 7 shows 2*N patches 82 for which reason the fiber extends according to 2*N directions radially spaced by 360°/N, and according to directions adjacent and parallel to such 2*N directions.

In this way, the disc 16 on the first side A of the wheel 10 has a greater thickness than the disc 18 on the second side B of the wheel 10.

In this way, it is possible to compensate for the difference in stiffness due to the difference in camber angle ALPHA, BETA (FIG. 4).

Of course, the number of patches 82 of the structural element or disc 16 on the first side A of the wheel is not necessarily double with respect to the number of patches 83 of the structural element or disc 18 on the second side B of the wheel.

Various other configurations of plies and patches are possible in the discs 16; 18. For example, in an alternative, each disc 16; 18 can have three such plies, having the weft/warp directions angularly offset by 120°.

The discs 16; 18 made as stated above preferably of composite material, although already having undergone hardening/polymerisation, are very thin and therefore, to avoid unsuitable stresses during manufacturing of the wheel 10, preferably they are initially applied and fixed in a removable manner, like for example through double-sided adhesive tape, to a respective applicator (not shown).

The adhesive substance arranged between the discs 16; 18 and the flanges 28; 30 of the hubs 12 and the regions 60; 62 of the rims 14 is preferably a bicomponent epoxy resin.

The assembly being processed is then put under a press with a suitable compression force, for example 2000 N at the areas provided with adhesive substance. For example, a pair of pressing rings (not shown) can be provided at the hub 12, and a pair of pressing rings (not shown) at the rim 14.

Advantageously, the compression force applied by the pairs of pressing rings (not shown) can be independently adjusted, so as to take possible misalignments between hub 12 and rim 14 into account.

In order to avoid collapsing of the sidewalls 52; 54 of the rim 14 during compression, especially in case the rim 14 lacks the radially inner wall 68 (see FIG. 12 later described), it is possible to temporarily insert an inflatable bag between the sidewalls 52; 54.

The pressure is maintained for a suitable time, for example 24 hours. Thereafter, the assembly is removed from the press and the assembly being processed is left to rest for a suitable time until the complete hardening of the adhesive substance, for example for two days.

Thereafter, the tension of the spokes 32 is loosened by partially unscrewing the nipples 34, then the applicators of the discs 16; 18 are removed, where provided for. Finally, the spokes 32 are completely dismounted and extracted from the rim 14; moreover, an opening 84 (FIG. 2) for access to the tire valve of the tire is made in one of the two discs 16; 18, thus completing the manufacturing of the disc wheel 10.

It should be noted that thanks to the fact that the seats 40 for the spokes are made on the facing faces of the flanges 28; 30 of the hub 12, the spokes 32 can be dismounted from the hub 12 despite the presence of the discs 16; 18.

Through the gluing of the discs 16; 18 to the hub 12 and to the rim 14 when the tensioned spokes 32 are present between them, and the subsequent release of such tension, the discs 16; 18 preserve a tensile stress and therefore obtain a structural role that replaces that of the tensioned spokes in a conventional spoked wheel.

The structural fiber extending according to radial directions as described above significantly contributes to carry out the aforementioned structural role.

The structural fiber extending according to radial directions contributes to the lateral strength of the wheel 10—namely the resistance against loads applied in the axial direction in an off axis position such as the loads when the rim 14 and the hub 12 tend to become offset due to the absorption of roughness of the ground or a jump, or more simply to make a bend or when the cyclist is standing on the pedals and the bicycle moves forward with right and left tilt.

The structural fiber extending according to chord directions as described above contributes to the torsional strength of the wheel 10—namely the resistance against loads applied in the tangential direction like that during pedalling and in braking conditions with disc brakes and in acceleration conditions, when the rim 14 tends to have a relative rotation with respect to the hub 12.

The lateral strength of the wheel 10, passing from the intermediate condition with the tensioned spokes to the final condition, increases. The Applicant believes that this improvement is due to the fact that each preloaded disc 16; 18 behaves like an infinite number of spokes an infinitely small distance apart, with a consequent distribution of the stresses over the entire surface of the disc.

If on the other hand the seats for the spokes 32 open in the outer faces, not facing each other, of the flanges 28; 30 of the hub 12, since the seats themselves must remain accessible for the removal of the spokes 32, the discs 16; 18 preferably have a correspondingly wide hole 72; 73 and therefore an additional step may be provided of gluing two substantially flat annular covers (not shown) at the outer faces of the two flanges 28; 30 of the hub 12, after the step of dismounting and extracting the spokes 32, to cover such seats for the spokes.

Going back to FIGS. 5-6, the Applicant believes that, by providing for the application of the temporary compression of the rim 14 towards the hub 12 to take place through tensioning elements 38 extending between the hub 12 and the tire coupling channel 26, the remarkable advantages described in the introductory part are obtained.

Figure 9:
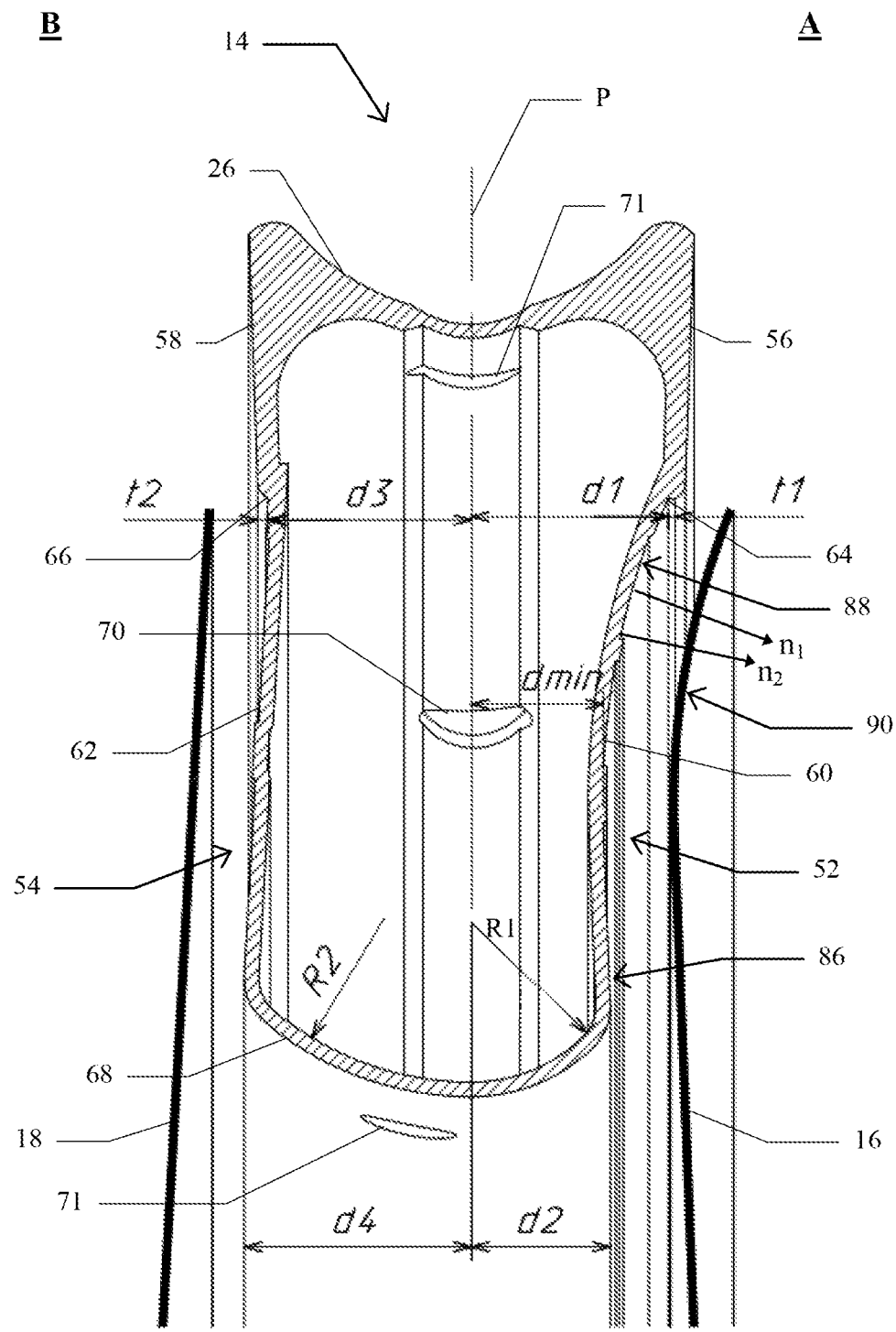
FIG. 9 illustrates a cross-section of a rim of the wheel of FIG. 1, two structural elements thereof being also partially shown.

The cross-section of the wheel rim 14 according to a first embodiment of the present invention is shown in greater detail in FIG. 9. The peripheral regions of the two structural elements 16; 18 are also indicated.

As described above, the rim 14 shown in FIG. 9 comprises the radially outer tire coupling region or wall 26 configured for coupling a tubular tire, the first sidewall 52 and the second sidewall 54 extending from the radially outer wall 26 towards the hub 12, and the radially inner wall or lower bridge 68 extending between the sidewalls 52; 54.

The second sidewall 54 of the rim comprises the radially outer braking region 58, and the radially inner region 62 for coupling with the structural element 18. The two regions form the step 66. In particular, the rise height t2 of the step 66 is very short and substantially corresponds to the thickness of the structural element 18 and of the film of adhesive substance. Once applied, the structural element 18 is therefore substantially flush with the braking region 58.

The region 62 for coupling with the structural element 18 of the second sidewall 54 of the rim 14 has a frusto-conical shape, with such an apex angle as to form the camber angle BETA (FIG. 4) in the radial section of the wheel 10.

The camber angle BETA is the angle formed between the median plane P, which represents a radius of the frustum of cone, and the apothem of the frustum of cone.

The first sidewall 52 of the rim also comprises the radially outer braking region 56 and the radially inner region 60 for coupling with the structural element 16. The two regions form the step 64.

In particular, the rise height t1 of the step 64 is very short and substantially corresponds to the thickness of the structural element 16 and of the film of adhesive substance. Once applied, the structural element 16 is therefore substantially flush with the braking region 56.

The region 60 for coupling with the structural element 16 of the first sidewall 52 of the rim 14, on the other hand, deviates from a frusto-conical shape.

More preferably, the region 60 of the first sidewall 52 of the rim 14 for coupling with the structural element 16 deviates from a frusto-conical shape such that the normals to the coupling region 60 in at least two points, like for example the normals n1 and n2 shown, converge on the side of the outer face of the coupling region 60, not facing the second sidewall 54.

Therefore, the region 60 for coupling with the structural element 16 of the first sidewall 52 is recessed as a whole.

In its radially inner region 86, namely in a radial position closer to the axis of rotation Z of the wheel 10, such a region for coupling with the structural element 16 of the first sidewall 52 corresponds to a frusto-conical surface, with such an apex angle as to form the camber angle ALPHA (FIG. 4) in the radial section of the wheel.

In its radially outer region 88, namely in a radial position further from the axis of rotation Z and closer to the braking region 56, such a region 60 for coupling with the structural element 16 of the first sidewall 52 is curved, with concave outer face—namely the face of the first sidewall 52 not facing the second sidewall 54.

In particular, the radius of curvature of the radially outer region 88 of the coupling region 60 of the first sidewall 52 is constant.

The distance from the median plane P of the coupling region 60 of the first sidewall 52, as the radial distance from the axis of rotation Z decreases, initially decreases from a value d1 to a minimum value dmin, and then increases to a value d2.

Preferably, such a distance uniformly increases from the minimum value dmin to the value d2, so as to form the portion of frusto-conical surface.

Preferably, the value d2 of the distance from the median plane P at the minimum radial distance from the axis of rotation Z is shorter than the distance d1 from the median plane P of the coupling region 60 at its maximum radial distance from the axis of rotation Z, namely at a radial distance of boundary between the braking region 56 and the region 60 for coupling with the structural element.

The distance from the median plane P of the coupling region 60 of the first sidewall 52 is maximum, of value d1, at its maximum radial distance from the axis of rotation Z, namely at a radial distance of boundary between the braking region 56 and the region 60 for coupling with the structural element.

The distance from the median plane P of the coupling region 62 of the second sidewall 54, as the radial distance from the axis of rotation Z decreases, increases from a minimum value d3 at its maximum radial distance from the axis of rotation Z, namely at a radial distance of boundary between the braking region 58 and the region 62 for coupling with the structural element, up to a maximum value d4 at the minimum radial distance from the axis of rotation Z.

Preferably, such a distance uniformly increases from the minimum value d3 to the maximum value d4, so as to form the frusto-conical surface.

Preferably, the distance from the median plane P of the coupling region 60 of the first sidewall 52 is shorter than the distance from the median plane P of the coupling region 62 of the second sidewall 54 at all the radial distances from the axis of rotation Z, apart from at a radial distance of boundary between the braking regions 56; 58 and the coupling regions 60; 62: i.e., d1 is equal to d3, but dmin, d2 and the intermediate distances on the first side A are shorter than d4 and than the intermediate distances on the second side B.

The radially inner wall 68 of the rim 14 on the side of the first sidewall 52 has a shorter radius of curvature R1 than the radius of curvature R2 on the side of the second sidewall 54.

The radii of curvature R1, R2 are suitably selected. With large values of the radius of curvature R1, R2, the radially inner region of the rim has a fairly rounded cross-section and the fibers of the composite material work better; vice-versa, with small values of the radius of curvature, the radially inner wall of the rim has a flatter shape in cross-section and therefore a better lateral strength.

The peripheral region of the first disc structural element 16 has a shape matching that of the coupling region 60 of the first sidewall 52.

Therefore, the first disc structural element 16 has a rise 90, in a peripheral region thereof.

Such a rise 90, extending annularly, is also visible in FIGS. 1-4.

This shape of the structural element 16 advantageously increases the stiffness thereof, as will be understood by those skilled in the art.

Other embodiments of the invention will now be described, wherein elements that are analogous to the first embodiment are numbered with analogous reference numerals, progressively increased by 100.

Figure 10:
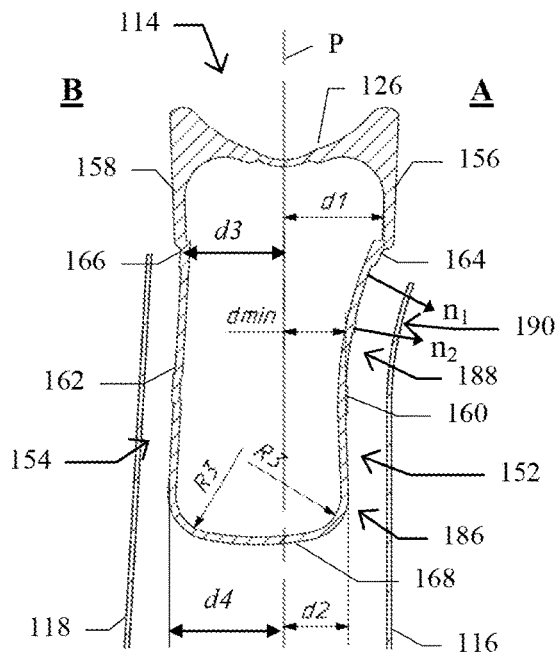

The cross-section of the wheel rim 114 according to a second embodiment of the present invention is shown in greater detail in FIG. 10. The peripheral regions of the two structural elements 116, 118 are also indicated.

This embodiment differs from the one just described in that the radially inner wall 168 of the rim 114 on the side of the first sidewall 152 has a same radius of curvature R3 as on the side of the second sidewall 154. The fiber of the composite material therefore works evenly on the two edges of the radially inner region of the rim 114.

Figure 11:
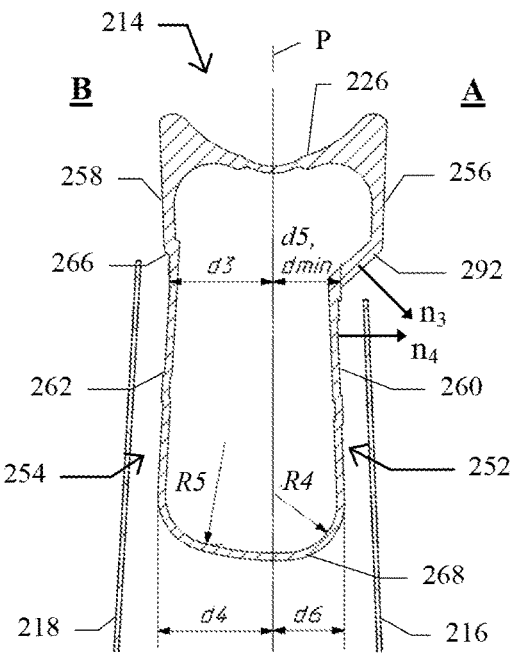

The cross-section of the wheel rim 214 according to a third embodiment of the present invention is shown in greater detail in FIG. 11. The peripheral regions of the two structural elements 216, 218 are also indicated.

As in the embodiment of FIG. 9, the radially inner wall 268 of the rim 214 on the side of the first sidewall 252 has a radius of curvature R4 that is smaller than the radius of curvature R5 on the side of the second sidewall 254. However, the radii of curvature R4, R5 are different from the radii of curvature R1, R2.

The second sidewall 254 is equal to that of the other embodiments described above.

However, the shape of the first sidewall 252 differs from that of the first sidewall 52, 152 of the embodiments of FIGS. 9 and 10.

The first sidewall 252 has a radially outer braking region 256, a radially inner region 260 for coupling with the structural element, and a joining region 292 between them.

The region 260 for coupling with the structural element of the first sidewall 252 is frusto-conical, defining the camber angle ALPHA (FIG. 4).

Preferably, the joining region 292 has a greater wall thickness than the region 260 for coupling with the structural element, as shown. Since the structural element 216 is not glued onto the joining region 292, the thickness of the joining region 292 must be such as to be substantially equal that which is overall obtained at the coupling region 260 once the structural element 216 is glued thereto.

The joining region 292 is frusto-conical, with opposite orientation with respect to the region 260 for coupling with the structural element, namely the apex of the generator cone lies on the left in FIG. 11.

Due to such a joining region 292, the radially outermost position, with respect to the axis of rotation Z, of the coupling region 260 of the first sidewall 252 is less radially outer than the radially outermost position, with respect to the axis of rotation Z, of the coupling region 262 of the second sidewall 254. Therefore, the radial extension of the two structural elements 216; 218 is different.

The first sidewall 252 of the rim 214 deviates, overall, from a frusto-conical shape so that the normals to the first sidewall 252 in at least two points, like for example the normals n3 and n4 shown, converge on the side of the outer face of the first sidewall 252, not facing the second sidewall 254.

Therefore, the first sidewall 252 is recessed as a whole.

The distance from the median plane P of the coupling region 260 of the first sidewall 252, as the radial distance from the axis of rotation Z decreases, increases, preferably uniformly increases, from a value d5 to a value d6.

Preferably, the value d6 of the distance from the median plane P at the minimum radial distance from the axis of rotation Z is shorter than the distance d5 from the median plane P of the coupling region 260 at its maximum radial distance from the axis of rotation Z, namely at a radial distance of boundary between the joining region 292 and the region 260 for coupling with the structural element.

Preferably, the distance from the median plane P of the coupling region 260 of the first sidewall 252 is shorter than the distance from the median plane P of the coupling region 262 of the second sidewall 254 at all of the radial distances from the axis of rotation Z: i.e., d5, d6 and the intermediate distances on the first side A are shorter than d3 and d4 and than the intermediate distances on the second side B.

The peripheral region of the first disc structural element 216 has a shape matching that of the coupling region 260 of the first sidewall 252.

Therefore, the first disc structural element 216 does not have any rise in a peripheral region thereof.

Figure 12:
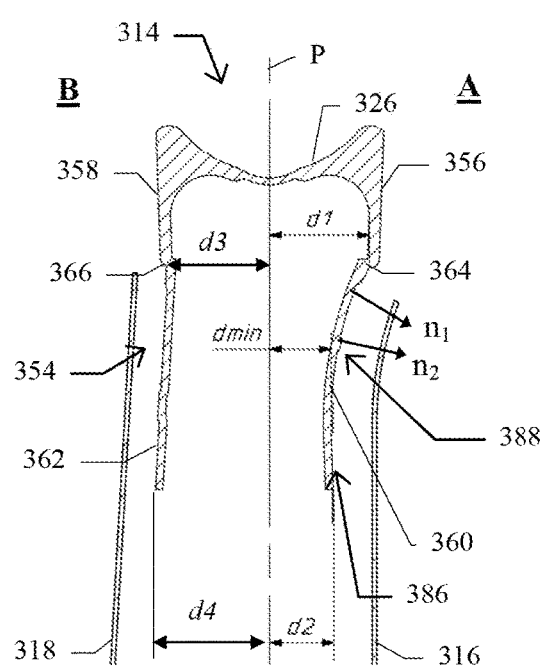

The cross-section of the wheel rim 314 according to a fourth embodiment of the present invention is shown in greater detail in FIG. 12. The peripheral regions of the two structural elements 316; 318 are also indicated.

The rim 314 shown in FIG. 12 differs from the one shown in FIG. 9 in that the radially inner wall or lower bridge is absent.

This rim 314 is therefore advantageously light.

Figure 13:
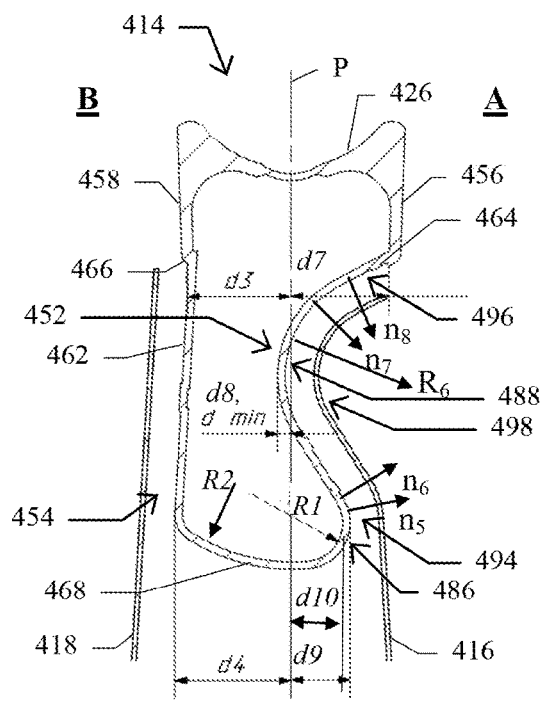

The cross-section of the wheel rim 414 according to a fifth embodiment of the present invention is shown in greater detail in FIG. 13. The peripheral regions of the two structural elements 416, 418 are also indicated.

The rim 414 comprises a radially outer tire coupling region or wall 426 configured for the coupling of a tubular tire, a first sidewall 452, and a second sidewall 454, which extend from the radially outer wall 426 towards the hub, and a radially inner wall or lower bridge 468 extending between the sidewalls 452, 454.

The second sidewall 454 of the rim is analogous to that of the other embodiments described above.

The first sidewall 452 of the rim also comprises a radially outer braking region 456 and a radially inner region 460 for coupling with the structural element 416. The two regions form a step 464.

The region 460 for coupling with the structural element 416 of the first sidewall 452 of the rim deviates from a frusto-conical shape.

In its radially inner region 486, namely in a radial position closer to the axis of rotation Z of the wheel, such a region 460 for coupling with the structural element 416 of the first sidewall 452 corresponds to a frusto-conical surface—even though this is not very clear in FIG. 13—, with such an apex angle as to form the camber angle ALPHA (FIG. 4) in the radial section of the wheel.

In a radially intermediate region 494 thereof, with respect to the axis of rotation Z, the region 460 for coupling with the structural element 416 of the first sidewall 452 has a convexity towards the outside, namely the normals to the coupling region 460 in at least two points of such an intermediate region 494, like for example the normals n5 and n6 shown, diverge.

In a radially outer region 488 thereof, with respect to the axis of rotation Z, the region 460 for coupling with the structural element 416 of the first sidewall 452 has a concavity towards the outside, namely the normals to the coupling region 460 in at least two points of such a radially outer region 488, like for example the normals n7 and n8 shown, converge on the side of the outer face of the coupling region 460, not facing the second sidewall 454.

Therefore, the region 460 for coupling with the structural element of the first sidewall 452 has a recess 496.

In particular, the radius of curvature R6 of the recess 496 of the coupling region 460 of the first sidewall 452 is constant.

The distance from the median plane P of the coupling region 460 of the first sidewall 452, as the radial distance from the axis of rotation Z decreases, initially decreases from a value d7 to a "negative" value d8—namely the coupling region 460 is located on the opposite side with respect to the median plane P—, then increases to a value d9, and finally decreases to a value d10 at the minimum radial distance from the axis of rotation Z.

Preferably, the value d10 of the distance from the median plane P at the minimum radial distance from the axis of rotation Z is shorter than the distance d7 from the median plane P of the coupling region 460 at its maximum radial distance from the axis of rotation Z, namely at a radial distance of boundary between the braking region 456 and the region 460 for coupling with the structural element.

The distance from the median plane P of the coupling region 460 of the first sidewall 452 is maximum, of value d7, at its maximum radial distance from the axis of rotation Z, namely at a radial distance of boundary between the braking region 456 and the region 460 for coupling with the structural element.

Preferably, the distance from the median plane P of the coupling region 460 of the first sidewall 452 is shorter than the distance from the median plane P of the coupling region 462 of the second sidewall 454 at all the radial distances from the axis of rotation Z, apart from at a radial distance of boundary between the braking regions 456; 458 and the coupling regions 460; 462: i.e., d7 is equal to d3, but d8, d9, d10 and the intermediate distances on the first side A are shorter than d4 and than the intermediate distances on the second side B.

The radially inner wall 468 of the rim 414 of the embodiment of FIG. 13 corresponds to that of the embodiment of FIG. 9.

The peripheral region of the first disc structural element 416 has a shape matching that of the coupling region 460 of the first sidewall 452.

Therefore, the first disc structural element 416 has a recess 498 in a peripheral region thereof.

This shape of the structural element 416 also increases the stiffness thereof, as is evident to those skilled in the art.

Figure 14:
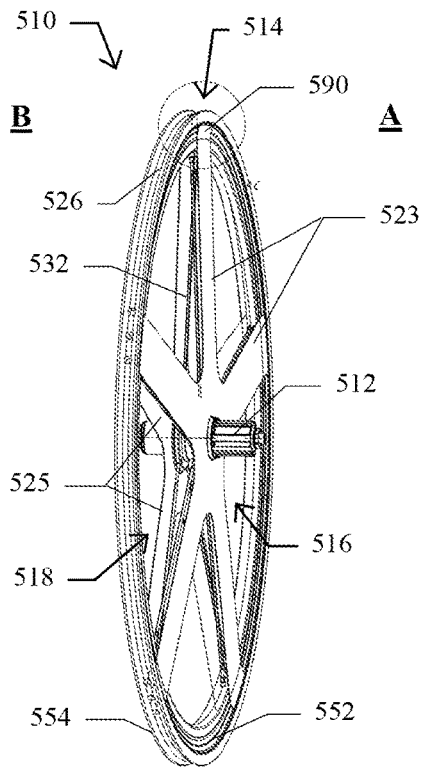
Figure 15:
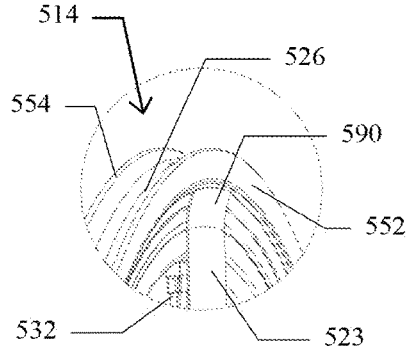
FIG. 15 illustrates a detail of FIG. 14; in particular the tensioning elements are still shown.

FIG. 14-15 illustrate a step of the manufacturing process of a spider wheel 510 according to the invention, thus relative to an embodiment wherein the discs are replaced by a pair of spider wheel-type structural elements 516; 518. The manufacturing process is the same as the one described above, with the proviso that the two spider wheel-type elements 516; 518 are applied with the spider legs 523; 525 in corresponding radial positions, so as to be facing each other. It is however also possible to offset the spider legs 523; 525 of the two spider wheel-type elements 516; 518 so as to double the number of spider legs in the wheel 510.

Moreover, as can also be seen in FIG. 14, during manufacturing just groups of spokes 532 are provided at the positions in which the spider legs 523; 525 of the spider wheel-type elements 516; 518 will be applied. The spokes 532 are then removed from the end wheel 510.

The spider wheel-type elements 516; 518 have a radially inner portion configured according to parts of a slightly frusto-conical surface, according to suitable camber angles ALPHA, BETA (FIG. 4).

In this case, each of the spider legs 523; 525 of the structural element 516 of the first side A, provided in the case shown for the component of the transmission (namely the freewheel body), comprises a rise 590 extending along an arc of circle, so that the structural element 516 overall comprises an "intermittent" rise.

Otherwise, the spider legs 523; 525 are substantially two-dimensional.

In an alternative embodiment, the rise might be replaced by an "intermittent" recess, similarly for example to the embodiment of FIG. 13.

Figure 16:
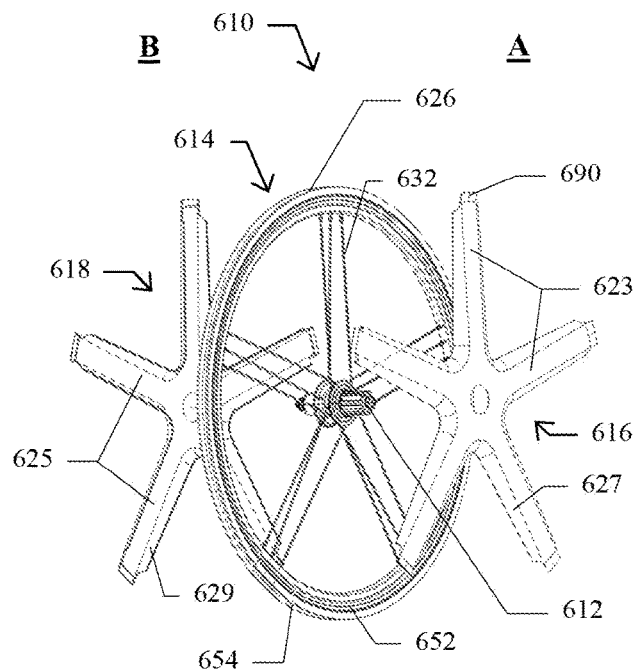

FIG. 16 illustrates a step of the manufacturing process of another spider wheel 610 according to the invention, regarding an embodiment that differs from that of FIG. 14 in that each spider wheel-type structural element 616; 618 is not substantially two-dimensional, rather it has edges 627; 629 bent towards the concavity of the frusto-conical shape— namely towards the median plane of the wheel—and configured and sized in such a way that when the spider legs 623; 625 of the two spider wheel-type elements 616; 618 are arranged facing each other in corresponding radial positions, the edges 627; 629 join together and as a whole define closed spider legs.

In this case, the sharp edges of the spider wheel-type elements 616; 618 are avoided, which might be sharp.

Also in FIG. 16 each of the spider legs 623 of the spider wheel-type structural element 616 on the first side A has a rise 690 extending along an arc of circle, so that the structural element 616 overall comprises an "intermittent" rise.

Otherwise, the spider wheel-type structural elements 616; 618 are substantially two-dimensional.

Figure 17:
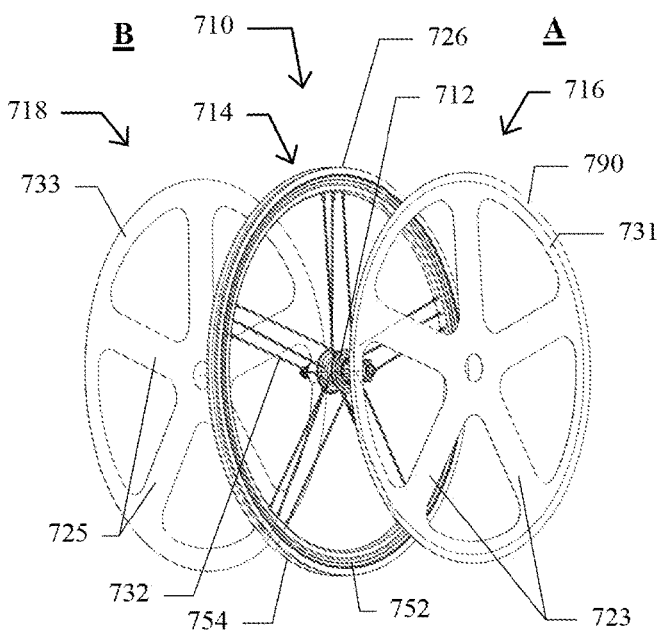

FIG. 17 illustrates a step of the manufacturing process of another spider wheel 710 according to the invention, regarding an embodiment that differs from that of FIG. 14 in that each spider wheel-type structural element 716; 718 has an annular portion 731; 733 at the ends of the spider legs 723; 725, to increase the gluing surface to the rim 714. Instead of an annular portion 731; 733 there can be widened portions at the radially outer ends of each spider leg 723; 725, not joined together.

Such an annular portion can also be provided in the closed spider legs embodiment of FIG. 16.

In the embodiments of FIGS. 14-17, five spider legs are shown, but their number can be different.

In the embodiments of FIGS. 14-17, spokes 532, 632, 732 of a radial spoking are shown, but alternatively also in the case of a spider wheel, a tangential spoking can be used. However, the spokes 532, 632, 732 are then removed from the finished wheel 510, 610, 710.

FIG. 18 schematically illustrates a partial cross-sectional view of a disc or lenticular wheel 810 configured for a bicycle equipped with a disc brake.

The hub 812 carries a brake disc 839. In the case shown, the brake disc 839 is mounted on the second side B of the wheel 810, opposite the first side A on which the freewheel body 824 that carries the sprockets of the transmission system is mounted.

The brake disc 839 and its elements for fixing to the hub 812 (not shown) occupy a certain space along the axis of the hub 822, but in the configuration shown, the space occupied by the brake disc 839 is less than that occupied by the freewheel body 824. Therefore, the flange 828 of the hub 812 is, also in this case, a shorter distance DA1 from the median plane P than the distance DB1 between the flange 830 of the hub 812 and the median plane P.

In the case (not shown) in which the brake disc 839 is mounted on the same side (indicated herein as first side A) of a rear wheel as the freewheel body 824, the hub flange 828 on such a side is, once again, the one a shorter distance from the median plane P.

In the case (not shown) of a front wheel, since the freewheel body is absent, the flange of the hub that is a shorter distance from the median plane P is the one on the side (again indicated herein as first side A) carrying the brake disc.

In all these cases, therefore, there is the problem of the different camber on the two sides of the wheel, which is solved according to the invention through the particular configuration of the rim.

The rim 814 shown in FIGS. 18 and 19 differs from that of FIG. 9 only in that the radially outer regions 856; 858 extend less in the radial direction, because they do not have to provide braking regions since, indeed, the braking takes place on the brake disc 839.

FIG. 19 also indicates the peripheral regions of the two structural elements 816; 818.

Those skilled in the art will understand that also in the case of a wheel equipped with a disc brake, configurations of the rim similar to those of FIGS. 10-13 are possible, wherein the radially outer regions 156; 158, 256; 258, 356; 358, 456; 458 are not configured to provide braking regions.

However, it is worthwhile emphasizing that the hub, the rim and the spokes can also differ substantially from the various embodiments shown.

Moreover, the radially outer region of the rim, in all of the embodiments, can be configured for types of tire different from a tubular tire.

In other embodiments, the seats for the spokes can be made in the radially inner wall or lower bridge of the rim 14, and corresponding openings can be made in the radially outer wall or upper bridge, for the passage of a nipple-tightening tool, in an analogous manner to what is described in the aforementioned EP 2 674 304 A1.

In other embodiments, it is possible to use tensioning elements different from spoke, nipple and centering washer. Out of the scope of protection of the manufacturing process according to the invention, an apparatus might be used which is capable of compressing the rim along its circumference, from the outside in a radial direction towards the axis of the hub. In this case, the seats for the spokes in the rim and in the hub, as well as the openings in the rim, can be dispensed with, directly allowing the application of tubeless tires.

Also in the case of disc structural elements, it is possible, during the manufacturing process, instead of arranging the spokes along the entire circumference of the hub and of the rim, to only provide groups of spokes at positions spaced along the circumference.

Vice-versa, also in the case of spider wheel-type structural elements, it is possible, during the manufacturing process, to arrange the spokes along the entire circumference of the hub and of the rim.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle disc or spider wheel, comprising:
a hub,
a rim having a radially outer tire-coupling region, a first sidewall, and a second sidewall,
a pair of disc or spider wheel-type structural elements integral with the hub and with the rim, wherein said structural elements are pretensioned,
the wheel having an axis of rotation (Z) and a median plane (P) extending orthogonally to the axis of rotation (Z) at an axially intermediate point of the radially outer region, and at an axially intermediate point of the hub,
wherein the first sidewall extends on a first side of the wheel, with respect to the median plane (P), on which a component of a motion transmission system or, when there is none, a disc of a disc brake is provided at the hub, and the second sidewall extends on the opposite side, with respect to the median plane (P),
wherein the first sidewall of the rim has a radially inner region with a minimum distance from the median plane (P) that is less than that of the second sidewall, and the radially inner region's minimum distance from the median plane (P) increases as the radial distance from the axis of rotation (Z) decreases.

2. The wheel according to claim 1, wherein the rim further comprises a radially inner wall extending between the sidewalls.

3. The wheel according to claim 2, wherein the radially inner wall of the rim on the side of the first sidewall has a radius of curvature smaller than the radius of curvature on the side of the second sidewall.

4. The wheel according to claim 2, wherein the radially inner wall of the rim on the side of the first sidewall has a same radius of curvature as on the side of the second sidewall.

5. The wheel according to claim 1, wherein the first sidewall and the second sidewall each have a radially inner region for coupling with a structural element of the pair, and the distance from the median plane (P) of the coupling region of the first sidewall is shorter than the distance from the median plane (P) of the coupling region of the second sidewall at all radial distances from the axis of rotation (Z), apart from at a maximum radial distance of the coupling regions.

6. The wheel according to claim 1, wherein the distance from the median plane (P) of a region of the second sidewall for coupling with the structural element increases as a radial distance from the axis of rotation (Z) decreases.

7. The wheel according to claim 1, wherein the distance from the median plane (P) of the radially inner region of the first sidewall for coupling with the structural element initially decreases and then uniformly increases as the radial distance from the axis of rotation (Z) decreases.

8. The wheel according to claim 1, wherein a distance from the median plane (P) of the radially inner region of the first sidewall for coupling with the structural element at a minimum radial distance from the axis of rotation (Z) is shorter than a distance from the median plane (P) of the radially inner region of the first sidewall at a maximum radial distance from the axis of rotation (Z) of the radially inner region of the first sidewall.

9. The wheel according to claim 1, wherein the distance from the median plane of the radially inner region of the first sidewall for coupling with the structural element is maximum at the maximum radial distance from the axis of rotation (Z) of the radially inner region of the first sidewall.

10. The wheel according to claim 1, wherein the radially inner region for coupling with the structural element of the first sidewall deviates from a frusto-conical shape.

11. The wheel according to claim 1, wherein the radially inner region for coupling with the structural element of the first sidewall deviates from a frusto-conical shape so that normals to the coupling region in at least two points converge on the side of an outer face of the coupling region not facing the second sidewall.

12. The wheel according to claim 1, wherein the radially inner region for coupling with the structural element of the first sidewall has a recess or is recessed as a whole.

13. The wheel according to claim 1, wherein each of the first sidewall and the second sidewall have a radially outer braking region.

14. The wheel according to claim 1, wherein the first sidewall has a radially outer braking region, the radially inner region for coupling with the structural element, and a joining region between them, wherein the joining region has a greater wall thickness than the region for coupling with the structural element.

15. The wheel according to claim 1, wherein the radially inner region of the first sidewall for coupling with the structural element has a curved radially outer region, with concave outer face.

16. The wheel according to claim 1, wherein the structural element of the pair extending between the hub and the rim on the first side of the wheel has, in a peripheral region thereof, a recess or a rise so as to have a shape matching that of a coupling region of the first sidewall.

17. The wheel according to claim 1, wherein the radially outer region of the rim has a plurality of attachment seats for tensioning elements, and a radially inner wall of the rim, where provided for, has a plurality of passage openings for said tensioning elements, said tensioning elements being absent in the finished wheel.

18. The wheel according to claim 1, wherein the structural element on the first side of the wheel has a greater number of plies of composite material than the structural element on the second side of the wheel.

19. A bicycle disc or spider wheel, comprising:
a hub,
a rim having a radially outer tire-coupling region, a first sidewall, and a second sidewall,
a pair of disc or spider wheel-type structural elements integral with the hub and with the rim, wherein said structural elements are pretensioned,
the wheel having an axis of rotation (Z) and a median plane (P) extending orthogonally to the axis of rotation (Z) at an axially intermediate point of the radially outer region, and at an axially intermediate point of the hub,
wherein the first sidewall extends on a first side of the wheel, with respect to the median plane (P), on which a component of a motion transmission system or, when there is none, a disc of a disc brake is provided at the hub, and the second sidewall extends on the opposite side, with respect to the median plane (P),
wherein the first sidewall of the rim has a minimum distance from the median plane (P) that is less than that of the second sidewall,
wherein the structural element on the first side of the wheel has a greater thickness than the structural element on the second side of the wheel.

20. Manufacturing process of a bicycle disc or spider wheel, comprising the sequential steps of:
a) providing a hub and a rim, the rim having first and second sidewalls,
b) applying a compression onto the rim towards the hub elastically deforming it,
c) rendering a pair of disc or spider wheel-type structural elements integral with the hub and with the rim, and
d) removing the compression onto the rim applied in step b),
wherein step b) comprises extending a plurality of tensioning elements between the hub and the rim and tensioning them, and step d) comprises removing the tensioning elements,
wherein in step b) the tensioning elements extend between the hub and a radially outer wall of the rim,
wherein in step c) the structural element on a first side of the wheel has a greater thickness than the structural element on a second side of the wheel,
wherein the wheel has an axis of rotation (Z) and a median plane (P) extending orthogonally to the axis of rotation (Z) at an axially intermediate point of the radially outer region, and at an axially intermediate point of the hub, and
wherein the first sidewall of the rim has a minimum distance from the median plane (P) that is less than that of the second sidewall.

21. A bicycle disc or spider wheel, comprising:
a hub;
a rim having a radially outer tire-coupling region, a first sidewall, a second sidewall, an axis of rotation (Z) and a median plane (P) extending orthogonally to the axis of rotation (Z);
a pair of pretensioned structural elements that are integral with the rim and a hub;
wherein the first sidewall extends on a first side of the rim, with respect to the median plane (P), and the second sidewall extends on the opposite side, with respect to the median plane (P),
wherein the first sidewall of the rim has a radially inner region with a minimum distance from the median plane (P) that is less than that of the second sidewall, and the radially inner region's minimum distance from the median plane (P) increases as the radial distance from the axis of rotation (Z) decreases.

22. The wheel according to claim 21, wherein the minimum distance from the median plane (P) of the radially inner region of the first sidewall initially decreases and then increases uniformly as the radial distance of the radially inner region from the axis of rotation (Z) decreases.

* * * * *